United States Patent [19]

Tschesche

[11] Patent Number: 5,027,700
[45] Date of Patent: Jul. 2, 1991

[54] BUNDLING AND STACKING MACHINE

[75] Inventor: Martin Tschesche, La Habra, Calif.

[73] Assignee: Western Metal, Inc., La Mirada, Calif.

[21] Appl. No.: 442,075

[22] Filed: Nov. 28, 1989

[51] Int. Cl.$^5$ .................. B65B 57/10; B65B 13/00; B65B 35/50; B65H 29/00

[52] U.S. Cl. .................................. 100/4; 100/8; 100/14; 414/751; 414/788.3; 414/791.3

[58] Field of Search .................. 100/4, 7, 14, 8; 414/788.3, 790.3, 791.3, 794.4, 778, 751

[56] References Cited

U.S. PATENT DOCUMENTS

| | | | |
|---|---|---|---|
| 1,716,080 | 5/1927 | Padilla | 100/7 |
| 3,057,289 | 10/1962 | Lüthi | 100/4 |
| 3,077,157 | 2/1963 | Gordon | 100/4 |
| 3,115,090 | 12/1963 | Elander | 414/788.3 |
| 3,774,778 | 11/1973 | Flaig | 414/751 |
| 3,920,132 | 11/1975 | Cleland et al. | 414/791.3 |
| 3,978,785 | 9/1976 | Stapp et al. | 414/790.3 |

Primary Examiner—David T. Fidei
Assistant Examiner—M. D. Patterson
Attorney, Agent, or Firm—Gregory Garmong

[57] ABSTRACT

A machine forms pairs of elongated articles, bundles the pairs, and then stacks the bundles. A receiver and inverter function together to hold one of the articles in place and then invert a second article onto the first article to form an article pair. A number of the article pairs, typically about five pairs, are stacked on a vertical lift that controllably moves downwardly as additional pairs are added. An optical sensor senses the position of the top of the topmost pair, and controls the position of the lift so that the measured top is at a preselected position that permits yet another pair to be added to the bundle. After the bundle is formed, it is pushed onto a conveyor where a cradle turns the bundle sideways through 90 degrees. At an intermediate point of the conveyor, a retractable holding stop halts the movement of the bundle to permit a banding machine to band the bundle together with one or more straps. A stacking unit picks up the banded bundle from the conveyor and moves it to a stacking location, where it is stacked together with a number of other bundles. The stacking unit makes use of proximity switches to control the horizontal and vertical movement so that engagement of the bundle and its placement onto the proper location are fully automated.

15 Claims, 3 Drawing Sheets

BUNDLING AND STACKING MACHINE

BACKGROUND OF THE INVENTION

This invention relates to automated materials handling apparatus, and, more particularly, to a machine that collects elongated articles into pairs and the pairs into bundles, and then stacks the bundles in an orderly fashion.

Many industrial processes produce elongated articles that must be handled in an orderly manner and stacked for delivery to the customer. In one example, steel is formed into U-shaped channel section pieces that are used as metal studs in construction. The sections are paired together after forming, with one of the channel pieces inverted with respect to the other. A convenient number of the pairs of pieces, typically five pairs, are bundled and banded. A number of the banded bundles are stacked on a conveyer or pallet.

Until now, the pairing, bundling, and stacking operations have been performed manually by a team of two workers. The work is physically demanding, and highly repetitious. The labor cost of the workers adds significantly to the cost of the product. There is therefore a need for a machine to perform the bundling and stacking operations, permitting the human workers to be assigned to more fulfilling tasks and reducing the cost of the delivered product. The machine must perform the operations in a satisfactory manner, and must be sufficiently sophisticated to accommodate variations in the product and stacking arrangement, and also avoid damage to the machine and the articles during stacking. The present invention fulfills this need, and further provides related advantages.

SUMMARY OF THE INVENTION

The present invention provides a bundling and stacking machine that processes elongated articles from a forming machine to an arrangement of bundles in an ordered stack. It is fully automated, and requires no continuing human supervision. It produces precisely stacked bundles of paired articles bound together with straps. The machine is carefully engineered to perform these functions with minimal likelihood of damage to the machine during the bundling and stacking operations, as might otherwise occur due to slightly misplaced or misoriented articles. The machine also has a great deal of operational flexibility, so that varying dimensions and counts of elongated articles and bundles can be handled without major adjustments to the machine. Thus, the machine produces precisely ordered stacks of preselected arrangements and counts without requiring precision adjustments and calibration, even when there are intentional or unintentional variations in the dimensions of the articles being stacked, within reasonable limits.

In accordance with the invention, apparatus for bundling and stacking elongated articles that have been previously formed comprises a receiver that receives a first elongated article and temporarily holds it in place; an inverter that receives a second article and inverts it onto the first article, forming an article pair; a lift that sequentially receives at least two of the article pairs, one on top of the other, to form a bundle; a longitudinal conveyor that conveys the bundle from a position proximate the lift; a banding machine that bands the bundle as it is supported on the longitudinal conveyor; and a stacking unit that receives the banded bundle from the longitudinal conveyor and stacks a preselected arrangement of rows and columns of bundles at a stacking location.

More specifically, apparatus for bundling and stacking elongated articles that have been previously formed comprises a receiver that receives a first article and temporarily holds it in place; an inverter that receives a second article and inverts it onto the first article, forming an article pair; a lift that sequentially receives at least two of the article pairs, one on top of the other, to form a bundle, the lift including means for controlling the position of the lift such that the top of the bundle is at a preselected height relative to the article pair formed in the inverter; a longitudinal conveyor that conveys the bundle from a position proximate the lift; a banding machine that bands the bundle as it is supported on the conveyor; and a stacking unit that receives the banded bundle and stacks a plurality of bundles, the stacking unit including a movable head having thereon means for controllably engaging the bundle and picking up the bundle from the conveyor, vertical movement means for moving the head vertically, the vertical movement means including a head support that is in lifting engagement with the head but is movable downwardly relative to the head when the head is externally supported, horizontal movement means for moving the head horizontally, and a vertical proximity sensor that senses the proximity of the head relative to the head support during vertical downward movement of the head support.

When the pair of articles is formed, the first article is preferably supported upon a lateral conveyor that moves it from the forming machine toward the lift upon which the bundles are formed. A first swing arm of a two-part inverter assembly is pivotally mounted to the frame, and a second swing arm is pivotally mounted to the first swing arm. The second article, to be inverted onto the first article, is tilted by the movement of the first swing arm to a partly inverted position. The second swing arm then activates and completes the inversion of the second article.

The pair of articles continues on the lateral conveyor to the lift that stacks several of the pairs into a group termed a bundle. It has been found that the top of the stack onto which each succeeding bundle is placed must be positioned precisely relative to the lateral conveyor and the pair of articles as it comes off the lateral conveyor. If the positioning is not precise, the pair of articles may not be able to move onto the top of the growing bundle, or may twist or turn as it is placed onto the stack, resulting in a misaligned bundle that cannot be properly stacked.

The lift therefore includes an optical sensor such as a visible or infrared light sensor that senses the position of the top of the partially formed bundle, and adjusts the position of the vertical drive of the lift so that the top of the partially formed bundle is at the correct height for the next pair of articles to be deposited in the right place.

After the bundle of typically 5 pairs is formed, it is pushed onto a longitudinal conveyor and preferably rotated 90 degrees. The rotation brings all of the pairs into contact with the longitudinal conveyor and minimizes the possibility that the bundle might become misaligned before it is banded. Whether rotated or not, the bundle is moved away from the lift by the longitudinal conveyor.

At an intermediate location along the longitudinal conveyor, the bundle contacts a retractable stop, which squares the end of the bundle as the conveyor drives the pairs against the stop. The bundle is banded, usually with a band near each end of the bundle, by the banding machine. At this point, the bundle becomes an integral unit that cannot readily become misaligned or separated, thereby improving convenience for the customer and permitting the bundle to be handled as a single item by the stacking machine.

The stacking machine picks up the bundles as they are delivered by the longitudinal conveyor, moves them laterally to a stack, and then stacks the bundles in rows neatly on a support in the proper locations. The preferred embodiment is used with steel U-channel articles, and therefore the articles can be engaged and lifted by the electromagnet in the head. Nonmagnetic articles could be handled equally well by grasping jaws or the like.

Whether the bundle is engaged by an electromagnet, jaws, or some other means, it is necessary that the movable head that contains the engagement means be placed in firm engaging contact with the bundle. In the present approach, the head is slidably supported in a vertical slot in a head support, which in turn is movable vertically and horizontally by motors. When the head is not supported, as it is when it is in contact with the bundle on the conveyor, the head hangs from the head support.

To engage the bundle, the head support with the supported head is moved vertically downwardly so that the head contacts the bundle. After the head comes into contact with the bundle, the head support continues to move downwardly. The slotted engagement between the head and the head support prevents any damage to the stacking machine or the bundle being handled. After the head support has moved downwardly relative to the head by a distance determined by the positioning of the vertical proximity switch, the vertical proximity switch operates to discontinue the vertical downward movement of the head support and to turn on the electromagnet. At this point the head is engaged to the bundle. The slotted engagement between the head and the head support and the vertical proximity switch permit the stacking machine to achieve firm lifting engagement of the bundle while accommodating variations in the dimension of the bundle without damage to the machine.

The vertical drive motor lifts the head support, head, and bundle to a height determined by an upper proximity limit switch, at which point the vertical drive motor is stopped and the bundle is held at that height. The horizontal drive motor is activated to move the supported head and bundle to a position over the location upon which the bundle is to be deposited. The horizontal movement is halted by activation of a horizontal proximity limit switch.

The head support and the supported head and bundle are moved downwardly until the bundle contacts the support or the prior layer of bundles, depending upon the extent to which the stack is complete. For a short time after the contact is made, the head support continues to move downwardly. After a short relative movement, the vertical proximity switch is again activated by the relative movement of the head and the head support, and the downward movement of the head support is halted. The microprocessor-controlled vertical drive motor is operated to raise the head by a small amount, typically about 1 inch, so that the supported bundle is out of contact with the stacking location or prior layer. This sequence of steps positions the bundle at the correct height to be deposited onto the stacking location or prior layer of bundles.

Correct lateral positioning is achieved by activating the longitudinal drive motor to move the bundle at the correct height until it contacts the previously deposited bundle in that row and turning off the electromagnet, thereby dropping the bundle at the correct position. Thus, the bundle drops a short distance, typically about 1 inch, into the correctly stacked position. The microprocessor counts the number of bundles placed onto the stack, or the number of rows of bundles, and signals a forklift operator when the stack is complete and ready to be moved. The time required to form a bundle in the lift, the stop mechanism, and the movement of the stacking unit act as a buffer to permit removal of the stack without interrupting the operation of the forming machine that is producing the articles in a continuous intermittent fashion.

The machine of the invention is therefore able to handle the articles as they emerge from the forming apparatus, pair them, bundle and band the pairs, and stack the pairs in the correct count in a fully automated fashion. The construction of the apparatus using limit switches, preferably of the proximity type, to control motion has the important advantage that variations in articles, slight misalignments, and machine inertia are accommodated without damage to the machine. Equally importantly, changeovers can be accomplished readily. For example, if one customer requires 10 articles per bundle and another customer requires 12 articles per bundle, it is not necessary to take the bundling and stacking machine out of service for adjustments. The lift is simply commanded to place six pairs into each bundle rather than five pairs. Changes to the stacking operation are not required. Similarly, if the width of each article is changed, or the stacking requirements are changed, the machine changeover is accomplished by a simple microprocessor command. It is not necessary to adjust and maintain close tolerances and the like during the changeover.

Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
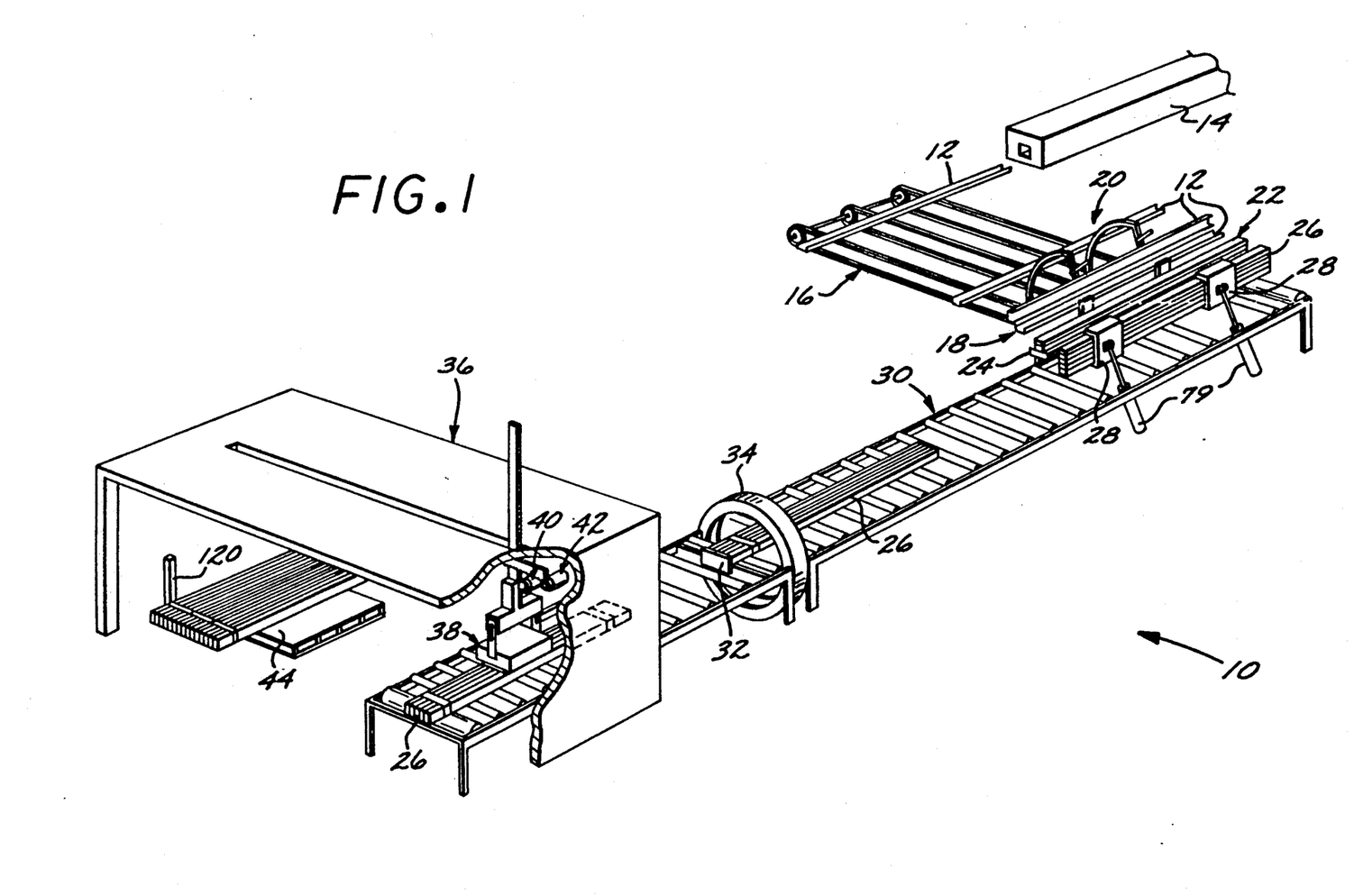
FIG. 1 is an overall perspective view of the bundling and stacking machine of the invention.

A preferred bundling and stacking apparatus 10 is illustrated in FIGS. 1-4. FIG. 1 is an overall perspective view of the apparatus 10, showing the major subsystems and their interrelationships. In FIG. 1, multiple articles being processed are shown at a variety of locations, so that the relation of the articles to the apparatus 10 may be understood. In normal operation, the articles will not normally be distributed through the system so closely together.

Single articles 12 are received by the apparatus 10 from a forming machine 14. Neither the structure of the article 12 nor the forming machine 14 form a part of the present invention. Typically, the articles 12 are elongated steel U-shaped channel sections used as studs in construction, and the forming machine 14 is a roll forming machine that forms coiled steel strip into the article 12.

The article 12 is received from the forming machine 14 onto a lateral conveyor 16. The lateral conveyor 16 moves the article 12 sideways, or perpendicular to its elongated direction. At an intermediate location 18 along the length of the lateral conveyor 16, the movement of the article 12 is halted. The article 12 is held in place until a second article of the same type is received by the horizontal conveyor 16 and moved into position laterally adjacent the first article (being held in position). The second article is inverted by an inverter 20 over the first article 12, so that the channels intermesh to form an article pair 22 having a pseudo boxlike arrangement.

A number of the article pairs 22 are moved along the lateral conveyor 16 to a lift 24 upon which they are placed to form a bundle 26. Typically, about five pairs 22 are combined in each bundle 26, but that number may be controllably varied. After the bundle 26 is formed, it is pushed onto a longitudinal conveyor 30 and turned sideways through 90 degrees (or, alternatively stated, on its side as compared with its original orientation), by the rotation of a cradle 28.

The bundle 26 is conveyed from the cradle 28 by the longitudinal conveyor 30, that moves the bundle 26 parallel to the long direction of the articles 12.

The bundle 26 is moved to a retractable stop 32, which is extended upwardly to halt the forward motion of the bundle 26 at a banding location. A conventional banding machine 34 sequentially bands each end of the bundle 26 by wrapping a plastic or fiber band tightly around the bundle 26 and sealing the band.

After banding, the bundle 26 is moved by the longitudinal conveyor 30 to a stacking machine 36. The stacking machine 36 engages and picks up the bundle 26 with a head 38 and an associated vertical drive 40. A horizontal drive 42 moves the head 38 horizontally so that the bundle 26 is over a stacking location 44. The vertical drive 40 operates again to lower the head 38 and the bundle 26 down to the stacking location 44 (or a row of previously stacked bundles, depending upon how many bundles have been stacked at that point), and the bundle is deposited onto the stack. The head 38 is moved back to its original position over the longitudinal conveyor 30 to await the arrival of another banded bundle.

Figure 2:
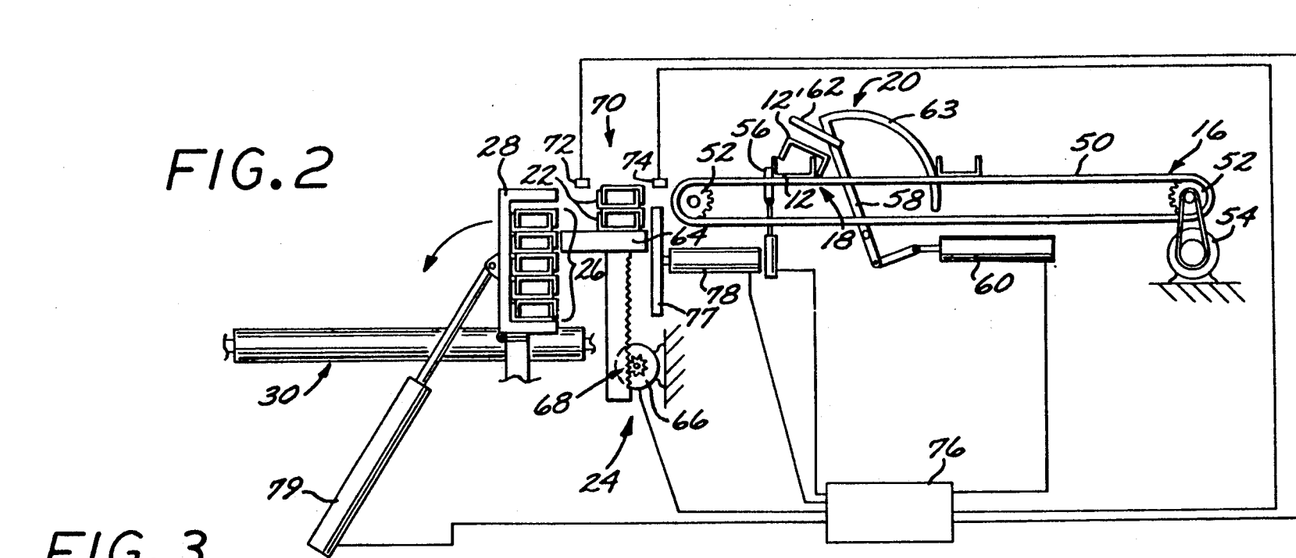
FIG. 2 is an end elevational view of the inverting mechanism, lateral conveyor, and lift mechanism.
Figure 3:
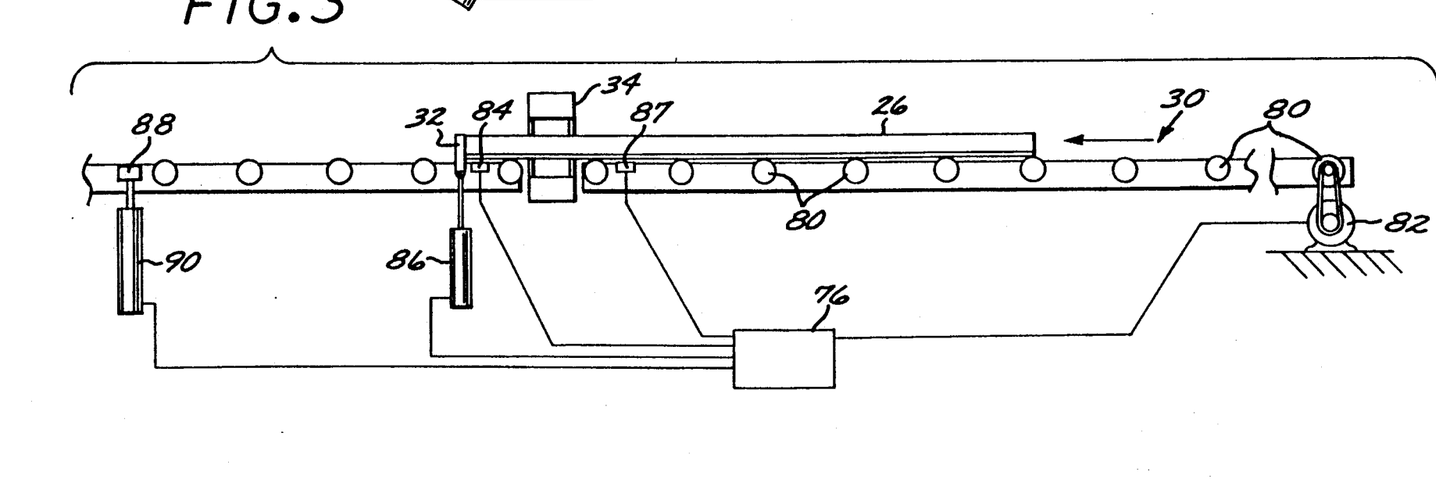
FIG. 3 is a side elevational view of the longitudinal conveyor, stop, and banding mechanism.
Figure 4:
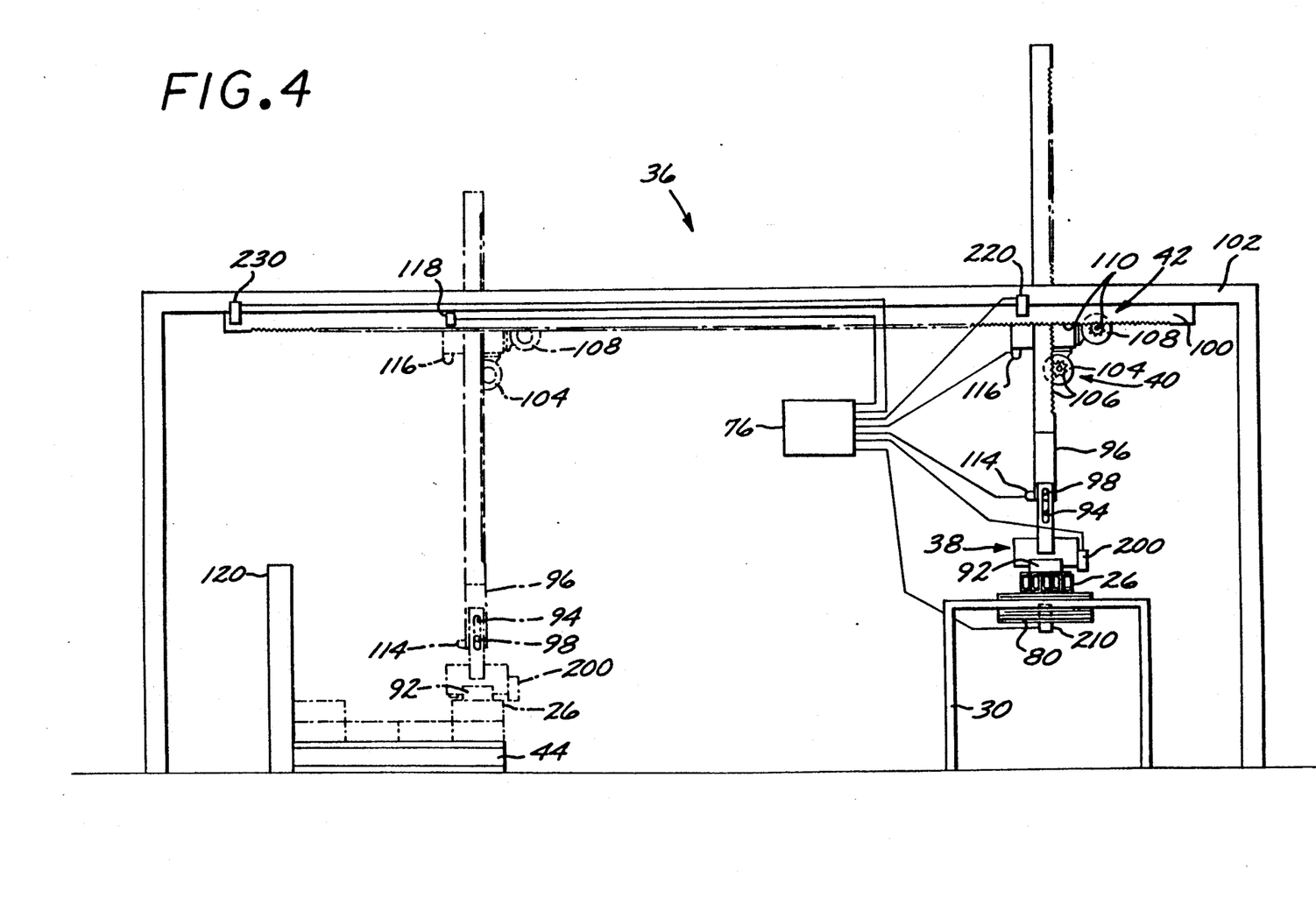
FIG. 4 is an end elevational view of the stacking unit.

FIGS. 2-4 show the major subsystems of the apparatus 10 in more detail.

FIG. 2 illustrates the lateral conveyor, inverter, lift, and cradle, and their interrelationship. (The point of view of FIG. 2 is from the opposite end of the apparatus of the point of view of FIG. 1.) The lateral conveyor 16 is preferably constructed as two or more (three in FIG. 1) moving endless chain belts 50 that are supported by support rollers 52. A motor 54 controllably turns the rollers 52, which in turn move the chain belt 50 forward so that articles 12 move from the right to the left in the view of FIG. 2.

A first article 12 whose U shape opens upwardly is moved forwardly on the chain belt 50 until it reaches the intermediate location 18. At this point, a retractable stop 56 is extended to halt the movement of the article 12. After a period of time, a second article 12' whose U shape opens upwardly is moved by the continuously moving chain belt 50 to a position immediately adjacent the first article 12. The second article 12' is turned over so that its U shape opens downwardly over the first article 12, with the U's interlocked, by the inverter 20.

The inverter 20 includes a first swing arm 58 that is pivotally supported at a location below the chain belt 50, and pivoted by the action of an inverter air cylinder 60. A second swing arm 62 is pivotally mounted to the first swing arm 58 at an intermediate location thereof. Inverting of the second article 12' is accomplished by operating the air cylinder 60 to pivot the first swing arm 58 and the article 12' upwardly, in the counter clockwise direction as illustrated in FIG. 2. When the first swing arm 58 reaches an intermediate rotation, the second swing arm 62 pivots out of the line of the first swing arm 58 further in the counter clockwise direction, aiding the article 12' in continuing in its path leading to inversion. The rotation of the first swing arm 58 by the air cylinder 60 is continued, until the second article 12' falls on top of the first article 12 in the inverted position, thereby forming one of the article pairs 22. A guard 63 in the form of an arc of a circle is attached to the remote end of the first swing arm 58. The guard 63 is disposed in the path of further articles that may be conveyed along the lateral conveyor 16 from the forming machine 14 while the inverter 20 operates, so that any such further articles cannot jam in the inverter 20 or otherwise interfere with its operation.

This inverter mechanism has been found to be reliable and durable. Early prototypes that used a single swing arm did not permit reproducible inversion of the second article, which could become jammed and possibly miss the first article when it fell. The assembly of two pivotally mounted swing arms overcame this problem. Two or more such inverter mechanisms are usually supplied, one toward each end of the article to be inverted and intermediate mechanisms in the case of longer articles.

A number of the article pairs 22 formed by the inverter 20 are placed together to form one of the bundles 26, on the lift 24. The lift 24 includes a vertically movable base 64. A lift motor 66 operates a drive 68 to move the base up and down vertically. This drive permits precise vertical positioning of the base 64.

An optical sensor 70 includes a light source 72 that directs a beam of light, typically either in the visible or infrared ranges, over the top of the base 64, if no article pairs are present, or the top of the stack of article pairs 22, if some article pairs are present. In the illustration of FIG. 2, two article pairs are present. The light beam is received by a detector 74, and the signal of the detector 74 is provided to a controller 76. The vertical positions of the source 72 and detector 74 are adjusted during initial setup of the apparatus 10 so that the top of the base 64 or stack of article pairs 22 is precisely positioned to receive the next article pair 22 as it is received from the lateral conveyor 16. If the vertical position of the base or stack is too high, the article pair will be blocked and cannot reach the lift 24. If the vertical position of the base or stack is too low, the next article pair 22 will fall from the lateral conveyor 16, but it may become misaligned or even turn on its side as it falls. Experience with the prototype of the apparatus 10 has shown that a vertical position of the top of the base or stack of previously deposited article pairs 22 is preferably about ¼ inch below the level of the article pairs 22 on the chain belt 50.

The controller 76 controls the vertical position of the base 64 through the operation of the motor 66 which positions the drive 68. The proper position is that point where the light beam of the optical sensor 70 is just broken. The controller 76 also counts the number of article pairs 22 that have been stacked on the base 64 at any time to establish the size of the bundle 26.

The bundle 26, formed of a number, typically five, of the article pairs 22, is vertically oriented as it is formed, as illustrated in FIG. 2. After the bundle is formed, it is pushed sideways by a pusher plate 77, actuated by the movement of an air cylinder 78, from its position on the base 64 to lie upon the longitudinal conveyor 30.

For the banding and stacking operations, it is desirable that the bundle 26 be turned through 90 degrees to rest on its side. To accomplish this turning operation, the cradle 28 is pivotally mounted, and may be pivoted by the operation of an air cylinder 79. The cradle 28 is a generally U-shaped structure that holds the unbanded bundle 26 in position as the pivoting occurs. The pivot point of the cradle 28 is located such that the bundle 26 is turned through 90 degrees, from a position initially on the longitudinal conveyor 30 to a final position that is also on the longitudinal conveyor 30.

The operation of the various moving parts of the system is controlled and coordinated by the controller 76. In addition to monitoring the optical sensor 70 and responsively controlling the height of the base 64 through operation of the motor 66, the controller 76 also operates the motor 66, the air cylinders 60, 78, and 79, the stop 56, and all other parts of the inverter subsystem. Moving elements of the other systems to be described in relation to FIGS. 3 and 4 are also controlled by the controller 76, which is preferably a programmed microprocessor, although mechanical switch type controllers could also be used.

As shown in FIG. 1 and in more detail in FIG. 3, the bundle 26 is moved from the vicinity of the inverter and cradle toward the stacking machine 36 by the longitudinal conveyor 30. The longitudinal conveyor 30 includes a plurality of rollers 80 spaced such that the bundle 26 rests upon at least several rollers 80 at once. Some of the rollers 80 are driven by motors, such as the motor 82. It is typically not necessary to drive all of the rollers 80, as some can act as idler rollers.

At a point along the length of the longitudinal conveyor 30, the leading end of the bundle 26 is sensed by a proximity sensor 84, causing the retractable stop 32 to be extended by the operation of an air cylinder 86. The leading end of the bundle 26 strikes the stop 32. Stopping the movement of the bundle 26 in this manner serves to square up the ends of the various article pairs of the bundle. The stop 32 is positioned so that the leading end of the bundle 26 has just passed the banding machine 34 when the leading end strikes the stop 32. A location on the bundle 26 near its leading end is banded by the banding machine 34, using a strong banding material such as plastic or fiber. After the banding of the leading end of the bundle 26 is complete, the stop 32 is retracted, and the singly banded bundle 26 moves forward on the conveyor 30 toward the left in the view of FIG. 3.

After the bundle 26 has moved a predetermined length, its trailing end is sensed by a proximity sensor 87. The controller 76 causes a banding lift 88, positioned below the conveyor 30 and actuated by an air cylinder 90, to lift the bundle 26. This lifting action raises the leading end of the bundle 26 off the conveyor 30 and stops its forward progress. Even though the driven rollers 80 continue to operate, the motion of the bundle 26 is halted because it is not in contact with the driven rollers 80. The proximity sensor 87 and banding lift 88 are positioned so that, when the bundle is lifted in this manner, its trailing end is located just to the right of the banding machine 34. A location on the bundle 26 near its trailing end is banded by the banding machine 34. The banding lift 88 is then retracted, and the driven rollers 80 again move the bundle 26, with both ends banded, along the conveyor 30. After banding of both ends of the bundle 26, the bundle can be viewed as a single integral item to be handled and stacked by the stacking machine 36. The arrival of the leading end of the bundle 26 at the stacking machine 36 is signalled by a proximity sensor 210 that is positioned below the conveyor 30.

FIG. 4 illustrates the stacking machine 36, from the same end as the vantage point of FIG. 1. The head 38 of the stacking machine 36 includes an electromagnet 92 positioned to contact the bundle 26 as it is moved into the stacking machine 36 on the longitudinal conveyor 30. The head 38 includes a vertically extending slot 94 that is slidably supported to a head support 96. When the head 38 is fully extended, the head 38 and its electromagnet 92 are supported from a pin 98 in the head support 96 that is disposed in the slot 94 and slides along the slot until it reaches the end of the slot. However, if the head 38 is pushed up or supported from below, the head can slide upwardly relative to the head support 96 by motion of the slot 94 along the pin 98.

The head support 96 is in turn movably supported from a longitudinally extending track 100 of an overhead gantry 102. A vertical drive motor 104 operates a drive 106 to move the head support 96 vertically up and down. A horizontal drive motor 108 operates a drive 110 to move the entire head support 96 laterally along the track 100.

The stacking machine 36 includes a number of proximity (or other type of) sensors that are instrumental in its control. A first vertical movement proximity sensor 114 is mounted on the head support 96. As the head support 96 and thence the head 38 move downwardly with the electromagnet 92 off, the head 38 and electromagnet 92 eventually contact the bundle 26. The head support 96 continues to move downwardly, but the head 38 is supported from below by the bundle 26 and therefore the pin 98 slides along the slot 94. The head 38 moves relative to the head support 96 to a position such that its presence is detected by the proximity sensor 114, which sends a signal to the controller 76. The controller 76 in turn stops the downward movement of the head support 96 by stopping the vertical drive motor 104. The controller 76 also turns the electromagnet 92 on to engage the bundle 26. Another proximity sensor 200 is pivotally mounted to the head 38 and extends below the bottom of the electromagnet 92. The sensor 200 is instrumental in effecting release of a bundle at the proper position, as will be described in more detail subsequently.

After the head 38 is engaged to the bundle 26, the vertical drive motor 104 is operated by the controller 76 to move the head support 96, the head 38, and the supported bundle 26 upwardly. A vertical proximity switch 116 is activated when the head support 96 reaches a position sufficiently high that the bundle and related mechanism can be moved horizontally without striking any of the stationary structure.

The horizontal drive motor 108 is operated by the controller 76 to move the head support 96, head 38, and bundle 26 laterally, to the left in the view of FIG. 4. The movement continues until the moving structure comes into the vicinity of a horizontal movement proximity sensor 118, which stops the motor 108. The horizontal movement proximity sensor 118 is positioned so that horizontal movement is halted with the bundle 26 above the stacking location 44. A forward limit proximity sensor 230 is provided as a backup to cut off the motor 108 in the event that the sensor 118 should fail, or during the stacking step to be described next.

The vertical drive motor 104 is operated to lower the head support 96, head 38, and bundle 26, so that the bundle 26 can be deposited upon the stacking location 44. The position of these elements is illustrated in a phantom view in FIG. 4. As the bundle is lowered to contact the stacking location 44 or the previously deposited row of bundles, eventually the contact pushes the bundle 26 and the head 38 upwardly, sliding the pin 98 along the slot 94. At the upward permitted extreme travel, the proximity switch 114 is activated, stopping the movement of the vertical drive motor 104 generally in the manner discussed previously. The motor 104 is next operated by the controller 76 in the reverse direction, to raise the head support 96, and thence the head 38 and the bundle 26, by some preselected amount. In the prototype apparatus 10, this movement was about 1 inch, so that the bundle 26 was raised just out of contact with the stacking location 44 or the previously deposited row of bundles. This movement establishes the correct vertical height for the bundle 26 in the stacking operation.

The horizontal drive motor 108 is operated to move the head 38 to the left in the view of FIG. 4, until the supported bundle 26 contacts either a post 120 or a previously stacked bundle. At the time of contact, the horizontal drive motor 108 continues to operate to move the head 38 to the left, but the movement of the bundle 26 is halted by the contact. The electromagnet 92 slides sideways to the left over the bundle 26, until the bundle 26 comes into proximity with the sensor 200. Upon detection of the bundle 26, the sensor 200 sends a detection signal to the controller 76, which discontinues power to the electromagnet 26 so that the bundle 26 drops, discontinues power to the horizontal drive motor 108 so that the sideways motion of the head 38 is halted, and energizes the vertical drive motor 104 to raise the head 38. The repeating of this procedure gradually builds up a regular stack at the location 44, regardless of variations in dimensions and preselected stacking sequences.

After each bundle 26 has been deposited at the stacking location 44, the vertical drive motor 104 operates to raise the head 38 to a sufficient height that it can be moved back over the conveyor to await the arrival of the next bundle 26. The horizontal drive motor 108 operates to move the head 38 to a position over the conveyor 30 (from the left to the right in FIG. 4). Movement in this direction is ended by the proximity of the head support 96 to a reverse movement limit sensor 220, which sends a signal to the controller 76 to halt the motor 108. The stacking sequence then repeats when a new bundle is detected by the sensor 210.

The stacking machine 36 stacks each bundle in precisely the correct position at the stacking location. Stacks having a preselected number of rows and columns may be formed by setting those values in the controller 76. The controller 76 keeps a count of the number of bundles in the stack. When the stack is full, the operator of a fork lift is signalled or, alternatively, the stack may be removed automatically as on a conveyor to permit the formation of another stack.

A prototype of the apparatus 10 has been constructed and operated. It functions satisfactorily in the manner described herein. The apparatus has the capability to switch readily between different types and dimensions of articles 12, without major readjustment and recalibration. For example, if the height, width, or length of the article is changed within reasonable ranges to fill a custom order, it is not necessary to adjust the lift 24, the banding machine 34, or the stacking machine 36, because control is achieved through proximity switches, light sensors, and control procedures that sense limits and do not depend on the dimensions of the articles.

The present invention thus provides a versatile apparatus for handling, bundling, and stacking elongated articles as they are produced or processed. Although a particular embodiment of the invention has been described in detail for purposes of illustration, various modifications may be made without departing from the spirit and scope of the invention. Accordingly, the invention is not to be limited except as by the appended claims.

What is claimed is:

1. Apparatus for bundling and stacking elongated articles that have been previously formed, comprising:
   a receiver that receives a first elongated article and temporarily holds it in place;
   an inverter that receives a second article and inverts it onto the first article, forming an article pair;
   a lift that sequentially receives at least two of the article pairs, one on top of the other, to form a bundle;
   a longitudinal conveyor that conveys the bundle from a position proximate the lift;
   a banding machine that bands the bundle as it is supported on the longitudinal conveyor; and
   a stacking unit that receives the banded bundle from the longitudinal conveyor and stacks a preselected arrangement of rows and columns of bundles at a stacking location, the stacking unit including
   means for controllably engaging each bundle,
   means for moving the engaged bundle horizontally and vertically, and
   means for sensing the position of the means for controllably engaging relative to the stacking location and for controllably releasing the bundle at the stacking location from the means for controllably engaging.

2. The apparatus of claim 1, wherein the lift includes means for controlling the position of the lift such that the top of the bundle is at a preselected height relative to the article pair formed in the inverter.

3. The apparatus of claim 2, wherein the means for controlling includes an optical sensor positioned to sense the location of the top of the bundle.

4. The apparatus of claim 1, further including a pivotably mounted cradle that rotates the bundle through 90 degrees, after the bundle is formed but before it reaches the banding machine.

5. The apparatus of claim 1, wherein the stacking unit includes sensor means for establishing the location of the bundle.

6. Apparatus for bundling and stacking elongated articles that have been previously formed, comprising:

a receiver that receives a first elongated article and temporarily holds it in place;

an inverter that receives a second article and inverts it onto the first article, forming an article pair;

a lift that sequentially receives at least two of the article pairs, one on top of the other, to form a bundle;

a longitudinal conveyor that conveys the bundle from a position proximate the lift;

a banding machine that bands the bundle as it is supported on the longitudinal conveyor; and a stacking unit that receives the banded bundle from the longitudinal conveyor and stacks a preselected arrangement of rows and columns of bundles at a stacking location, wherein the stacking unit includes a movable head having thereon means for controllably engaging the bundle and picking up the bundle from the conveyor, vertical movement means for moving the head vertically, the vertical movement means including a head support that is in lifting engagement with the head but is movable downwardly relative to the head when the head is externally supported, horizontal movement means for moving the head horizontally, a first vertical proximity switch mounted on the movable head that senses the presence of the bundle during vertical downward movement of the head, and activates the means for controllably engaging, and a horizontal movement proximity switch that senses the presence of the head over a preselected stacking location.

7. The apparatus of claim 6, wherein the means for controllably engaging is an electromagnet.

8. Apparatus for bundling and stacking elongated articles that have been previously formed, comprising:

a receiver that receives a first article and temporarily holds it in place;

an inverter that receives a second article and inverts it onto the first article, forming an article pair;

a lift that sequentially receives at least two of the article pairs, one on top of the other, to form a bundle, the lift including means for controlling the position of the lift such that the top of the bundle is at a preselected height relative to the article pair formed in the inverter;

a longitudinal conveyor that conveys the bundle from a position proximate the lift;

a banding machine that bands the bundle as it is supported on the conveyor; and a stacking unit that receives the banded bundle and stacks a plurality of bundles, the stacking unit including a movable head having thereon means for controllably engaging the bundle and picking up the bundle from the conveyor, vertical movement means for moving the head vertically, the vertical movement means including a head support that is in lifting engagement with the head but is movable downwardly relative to the head when the head is externally supported, horizontal movement means for moving the head horizontally, and a vertical proximity sensor that senses the proximity of the head relative to the head support during vertical downward movement of the head support.

9. The apparatus of claim 8, wherein the inverter includes a first swing arm that pivots relative to the first article, a second swing arm pivotably connected to the first swing arm at an intermediate location along the length thereof, and means for pivoting the first swing arm relative to the first article.

10. The apparatus of claim 8, wherein the means for controlling of the lift includes a light sensor to sense the location of the top of the bundle as it is formed.

11. The apparatus of claim 8, further including a pusher that pushes the bundle from the lift to the longitudinal conveyor.

12. The apparatus of claim 8, further including a pivotably mounted cradle that rotates the bundle through 90 degrees, after the bundle is formed but before it reaches the banding machine.

13. The apparatus of claim 8, wherein the means for controllably engaging is an electromagnet.

14. Apparatus for bundling and stacking elongated articles that have been previously formed, comprising:

a receiver that receives a first article and temporarily holds it in place;

an inverter that receives a second article and inverts it onto the first article, forming an article pair, the inverter including a first swing arm that pivots about a support to partially invert the second article, and a second swing arm that is pivotally connected to the first swing arm and pivots about the first swing arm to complete the inversion of the second arm;

a lateral conveyor that moves the article pair laterally to the length of the elongated articles;

a lift that sequentially receives at least two of the article pairs from the lateral conveyor, one on top of the other, to form a bundle, the lift including an optical sensor that senses the vertical position of the top of the bundle, and a lift vertical drive that moves the lift responsive to the signal of the optical sensor so as to maintain a preselected vertical position of the top of the bundle thereon;

a cradle that receives the bundle from the lift and turns the bundle through 90 degrees;

a longitudinal conveyor that receives the bundle from the cradle, the longitudinal conveyor having a retractable holding stop therein at a banding location;

a banding machine that bands the bundle at the banding location; and a stacking unit that receives the banded bundle and stacks a plurality of bundles, the stacking unit including a movable head having an electromagnet therein that controllably engages the bundle, and picks up the bundle from the conveyor, vertical movement means for moving the head vertically, the vertical movement means including a head support that is in lifting engagement with the head but is movable downwardly relative to the head when the head is externally supported, horizontal movement means for moving the head horizontally, a vertical proximity switch mounted on the electromagnetic head that senses the proximity of the head and the head support, and a horizontal movement proximity switch that senses the presence of the head at a preselected location.

15. The apparatus of claim 14, wherein the article is a U-shaped channel section.

* * * * *